United States Patent [19]
Girard et al.

[11] 3,849,005
[45] Nov. 19, 1974

[54] METHOD AND DEVICE FOR ESTIMATING A GASEOUS COMPONENT

[75] Inventors: André Girard, Chatenay-Malabry; Jean Laurent, Palaiseau, both of France

[73] Assignee: Office National D'Etudes et de Recherches Aerospatiales (ONERA), Chatillon-Sous-Bagneux, France

[22] Filed: Apr. 13, 1973

[21] Appl. No.: 350,975

[30] Foreign Application Priority Data
Apr. 21, 1972 France .......................... 72.14150

[52] U.S. Cl. ................. 356/201, 250/338, 250/353, 356/51
[51] Int. Cl. ...................... G01n 21/22, G01n 21/34
[58] Field of Search ...... 356/51, 201; 250/338, 345, 250/353

[56] References Cited
UNITED STATES PATENTS
3,250,174  5/1966  Lutz ................................... 356/51
3,723,731  3/1973  Blau, Jr. .............................. 356/51

*Primary Examiner*—Vincent P. McGraw
*Attorney, Agent, or Firm*—Larson, Taylor and Hinds

[57] ABSTRACT

The absorption or emission of a characteristic radiation of the component is measured. The device comprises two chambers containing a predetermined weight of the component to be estimated. The second chamber contains a weight of this component greater than that in the first chamber. A third chamber contains no absorbing component. A beam of radiation coming from the mixture to be analysed passes alternately through the first two chambers, then half through each of the two other chambers. A detector receives the beam coming from the chambers through a filter. The method and device are useful for the estimation of pollutants in the atmosphere.

11 Claims, 4 Drawing Figures

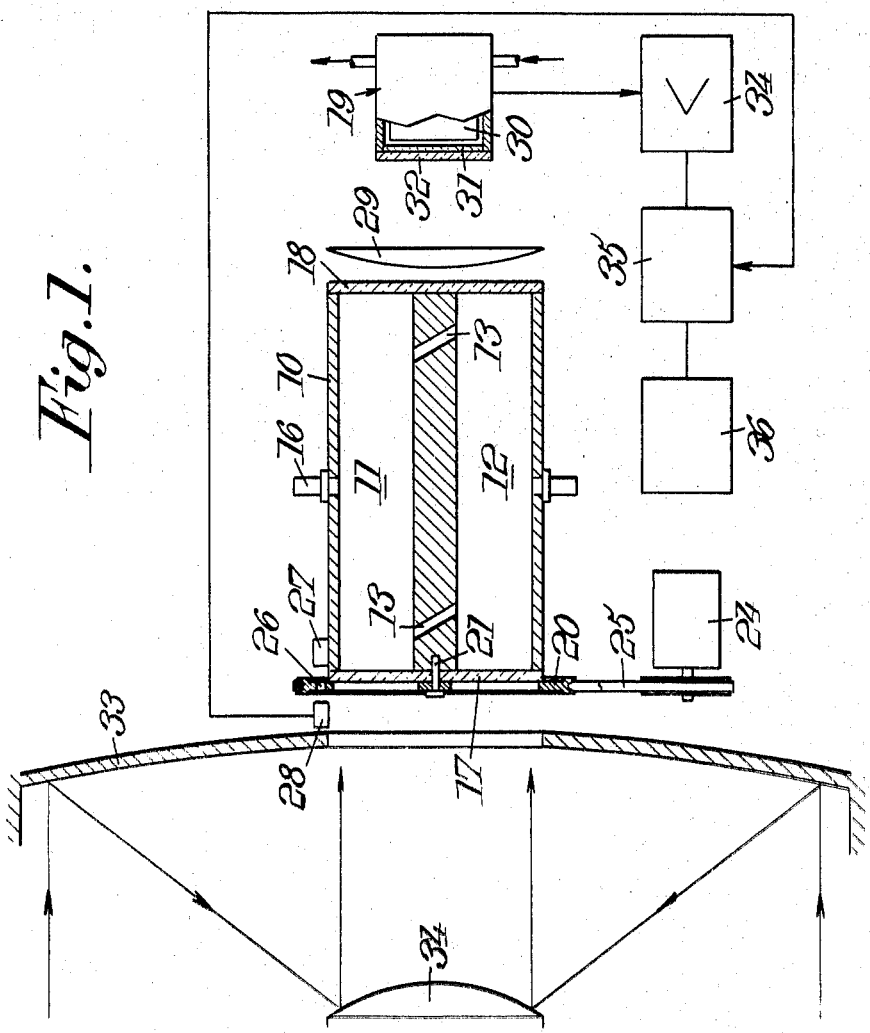
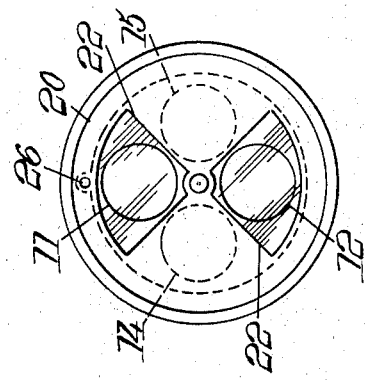

PATENTED NOV 19 1974 3,849,005

METHOD AND DEVICE FOR ESTIMATING A GASEOUS COMPONENT

The present invention relates to the estimation of a component of a gaseous mixture by absorption or emission of the characteristic radiation from this component, that is to say a radiation at a frequency of the absorption or emission lines. The term "gaseous" must obviously be interpreted in a broad manner and as denoting both a vapor and a gas proper.

There already exist numerous analytical devices for gaseous mixtures — or estimation of one of the components of a gaseous mixture — which use the specific emission or absorption properties of each gas, in particular in the infrared. There are known for example analysers into which a beam of infrared light is directed coming from a mixture of which one component (having obviously an absorption band in the infrared) is to be estimated, towards a detector, alternately through a chamber containing said component and through another chamber filled with a gas not having an absorption band within the wavelength range of the light constituting the beam. This system is convenient for analysis when the mixture constitutes the sole source of radiation directed towards the chambers. This is the case in the measurement of the content of carbonic acid gas in the atmosphere seen from space. If on the other hand the emission of the gas is added to that of a source having a continuous spectrum, this source gives rise to a signal and the interpretation of the results supplied by the detector is delicate.

Detectors are also known into which a beam of light is passed successively coming from a suitable source through the mixture which has to contain the gaseous components to be detected, then through two pneumatic detectors mounted differentially which interpose in the path of the beam different weights of the constituent to be estimated. The pneumatic detectors, having to operate at ambiant temperature, have low sensitivity. Consequently, this device is only usable in practice when the source of light passing through the mixture is sufficiently intense, which is not the case when this source is the emission itself of the base of which the mixture is placed.

It is an object of the invention to provide a method and a device for estimating a component of a gaseous mixture responding better than previous systems to the exigencies of practice, especially through its increased sensitivity which enables in particular utilisation without a source of artificial light.

To this end, the invention provides in particular a method of estimating a component of a gaseous mixture by absorption or emission of radiation, characterised especially in that a beam of radiation, coming from said mixture and having a spectral band in which at least one ray from said component occurs, is made to pass alternately on one hand through a first enclosure in which the beam encounters a predetermined weight of the component to be estimated and on the other hand partly through a second enclosure where the beam encounters a weight of the component to be estimated greater than the preceding one and for the rest through a weight of said component less than said preceding weight, and in that the resulting beam is directed towards a detector of the variations in intensity of said beam.

The invention also provides a device for applying the above-defined method, which device is characterised especially in that it comprises a first enclosure containing a predetermined mass of the component to be estimated, a second enclosure containing a weight of the component to be estimated greater than the preceding one and a third enclosure containing a weight substantially nil of said component, means for directing alternately a beam of radiation coming from said mixture on one hand through the first enclosure, on the other hand for a predetermined portion through the second enclosure and for the remainder through the third enclosure, a filter interposed in the output beam from the enclosures and only transmitting a fraction of the spectral absorption or emission band from said component to be detected, a detector placed to receive the beam transmitted by the filter and means for measuring the variations of the signal from the output of the detector.

This arrangement enables the use of a detector selected for its high sensitivity, since it has no longer to have an absolute sensitivity. There can especially be adopted quantity detectors cooled to very low temperature, using crystals (cadmium telluride for example) or bolometers. The detector, as well as the suitable band-pass filter which is associated with it, is placed in a cryostat and cooled by a liquefied gas (nitrogen or even helium). Sensitivities are thus obtained which exceed 100 times that of pneumatic detectors.

The portion of the beam which passes through a nil content of the component to be estimated can arrive at the detector directly, but it is preferable to make it pass through a chamber having a constitution identical with that of chambers constituting the first enclosure and the second enclosure, to equalise parasitic absorptions on all paths. All the chambers are then advantageously filled at the same total pressure and kept at the same temperature. In general, it is also advantageous to make the beam pass through the same length in each chamber.

The invention is particularly applicable to the determination of the atmospheric concentration of various pollutants which have an absorption line in the infrared. The measurement can then be effected without sampling and on very considerable atmospheric thicknesses. In fact, neither nitrogen nor oxygen have notable absorption in the infrared. As for water vapor, it has a very spread-out absorption spectrum, but limited to certain regions.

In the case of the measurement of the content of pollutants (such as burnt hydrocarbons nitrogen oxides, $SO_2$) in the atmosphere above a city, it is generally advantageous to associate with the device, a light concentrator, constituted for example by telescope, supplying, from a cylindrical input beam, a cylindrical output beam of smaller diameter having a constant energy density if the input beam has a constant energy density. The light source will be the background (emission itself of the body at ambiant temperature) or an artificial source such as a projector.

The invention will be better understood on reading the description which follows of an embodiment of a device for estimating an atmospheric pollutant, intended to cooperate in the infrared, and modifications constituting particular embodiments, given by way of non-limiting examples. The description refers to the drawings which accompany it, in which:

FIG. 1 shows in diagrammatic manner, a device according to a first embodiment, the optical portion being shown in section along a plane passing through an axis;

FIG. 2 is a view from the left of the assembly of chambers and of the modulator of the device of FIG. 1;

Figure 3:
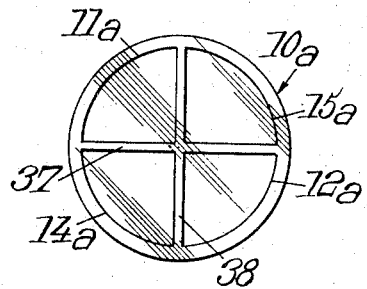
FIG. 3 is an end view showing the chamber of a device constituting a first modification.

The device illustrated in FIGS. 1 and 2 comprises a cylindrical block 10 in which are arranged parallel to the axis, four passages also cylindrical, distributed at regular angular intervals, constituting chambers. Two opposite chambers 11 and 12 communicate through transverse pipes 13 pierced through the central portion of the block. These two chambers constitute the enclosure intended to receive a non-absorbant gas, but containing a first proportion of the component to be estimated. Two chambers positioned between the preceding ones (FIG. 2), one 14 is intended to receive a mixture absorbing at the same pressure as that which occupies chambers 11 and 12, but having a greater content of the components to be estimated. Lastly, the latter chamber 15 contains only the non-absorbant gas, at the same pressure as in the preceding chambers.

Against the terminal faces of the cylindrical block 10 are fixed in sealed manner supports 17 and 18, for example by adhesion. These ports could as well be fixed by dismountable members such as screws. However the latter solution has the drawback of obliging a seal to be provided around the opening of each passage to effect fluid-tightness. These seals are cumbersome and oblige a greater space to be left between the chambers, which reduces the sensitivity of measurement since it leads to non-use of the portion of the incident beam which is arrested by the block between two successive chambers. Closable connectors, such as those illustrated at 16 in FIG. 1, enable the filling or emptying of the chambers.

A modulator is provided so tha the beam transmitted to the detector 19 which follows the block 10 emerges alternately from chambers 11 and 12 and chambers 14 and 15. In the embodiment illustrated in FIGS. 1 and 2, this modulator is placed in front of the chambers on the part of the light beam. It could in certain cases be placed immediately behind the chambers.

The modulator illustrated is constituted by a disc 20 mounted to rotate on a pin 21 fixed to the block 10 in the axis of the latter. The disc 20 has two cut-outs 22 diametrically opposite, each having an angular range of 90° and a radial length sufficient to uncover the whole of a chamber when they pass before the latter. The disc 20 is rotated by a motor 24 whose output shaft actuates a belt 25 passing over the periphery of the disc 20, constituting a pulley.

The disc illustrated in FIG. 1 comprises at its outer portion a hole 26 intended to provide a synchronizing signal. On each passage of the orifice 20 between a light source 27 and a sensitive member 28, the latter supplies an electrical pulse which is used in the detection of the useful signal, as will be seen below.

The light beam emerging from the chambers is sent to the detector 19 through an optical system shown diagrammatically in the shape of a single lens 29. This detector comprises a sensitive member 30 which does not have to be selective in frequency and can hence be selected for its high sensitivity. The sensitive member is preceded by a filter 31 of which the bandpass corresponds to a fraction of an emission band or absorption band of the component to be estimated and it is centered on the intense lines of this band. There could especially be used a high sensitivity detector, such as a crystal or bolometer cooled to cryogenic temperature by a liquefied gas circulating in an enclosure surrounding the sensitive member 30 and the filter 31. This enclosure is then provided with an input window 32 nonselective in frequency.

The device illustrated in FIG. 1 intended for the detection of the atmospheric content of a pollutant gas over considerable thicknesses, comprises at the front a concentrating optical system whose presence is not necessary in numerous cases, in particular when the mixture to be analysed is available in the form of a sample. The optical concentrator, illustrated in FIG. 1 on a much smaller scale than that of the block 10 for greater clarity, is constituted by a telescope optical system. The primary mirror 33 of the telescope concentrates the incident beam onto a secondary mirror 34 which directs a parallel beam onto the modulator 20. This arrangement enables the conservation of a constant energy density if the input beam has itself a constant density, which property is necessary for the device to provide a satisfactory response.

At this stage, and before describing the electronics for treating the signal provided by the detector 29, it may be useful to give a succinct description of the principle of operation of this device.

On operation the modulator disc 20 presents successively its cut-outs in front of the chambers 11 and 12 and in front of the chambers 14 and 15. Consequently, the detector receives alternately two luminous fluxes whose amplitudes $A_1$ and $A_2$ are given, to a same fairly constant factor, by the formulae:

$$A_1 = \int_{\nu_1}^{\nu_2} L(\nu) . \tau(u_1) . 2\tau(u_2) . d\nu \quad (1)$$

$$A_2 = \int_{\nu_1}^{\nu_2} L(\nu) . \tau(u_1) 1 + \tau(u_3) d\nu \quad (2)$$

In these two formulae:

$\nu_1$ and $\nu_2$ are the frequencies limited by the band-pass of the filter 31;

$L(\nu)$ is the luminescence of the source;

$u_1$ is the content of the constituent to be estimated in the mixture; (which component has at least one line between $\nu_1$ and $\nu_2$);

$u_2$ and $u_3$ are the contents of the constituent to be estimated of the chambers 11–12 on one hand, 14 on the other hand (or, which amounts to the same thing, the partial contents of the constituent since the chambers are all of the same volume);

$\tau(u_1)$, $\tau(u_2)$ and $\tau(u_3)$ are the transmission factors correspondant to $u_1$, $u_2$ and $u_3$; these factors are constituted by the value of the same function $\tau$ for the values $u_1$, $u_2$ and $u_3$ respectively.

The signal provided by the receiver has a modulation of amplitude $A$ equal to $A_1 - A_2$ (given by the formulae 1 and 2), that is to say:

$$A = \int_{\nu_1}^{\nu_2} L(\nu) . \tau(u_1) 2\tau(u_2) - 1 - \tau(u_3) d\nu \quad (3)$$

This formula is valid when the chambers 15 and 15 offer the instant beam the same passage cross-section. There would be a slightly different formula (1 being replaced by a coefficient $\alpha$ and $\tau(u_3)$ being effected by a factor $(2 - \alpha)$ if, the total cross-section traversed by the beam in the pairs of chamber being the same, the distribution is different).

$$\text{When } u_1 = 0 \quad \tau(u_1) = 1$$

if there is no other component of the mixture presenting an absorpiton line between $\nu_1$ and $\nu_2$.

By a suitable choice of $u_3$ and $u_2$ the corresponding value of $l$ can be rendered nil. If $\tau(u_1)$ was independent of $\nu$, the output would remain nil in the case of the variation of $u_1$. But being given that $\tau(u)$ is not only a decreasing function of $u$, but also a function of $\nu$, modulation will appear when $u_1$ ceases being nil. The theory shows and expereince confirms that A varies with $u_1$, in substantially proportional manner for slight values of $u_1$.

This amplitude of the modulation of the output signal from the detector 19 is determined by an electronic system comprising an amplifier 34 having a band-pass compatible with the frequency fixed by the modulator disc 20 and a synchronous detector 35 which receives a reference signal from the photosensitive member 28. The output signal from the detector 35 can be referenced or furnished by a recorder 36, for example a paper band recorder.

When maximum sensitivity is sought, it is advantageous to adopt a value of $u_3$ which is as high as possible compatible with the other requirements. For example one must not, in the case of steam, exceed the partial pressure corresponding to the saturated vapor present. The total pressure in the chambers (in the case of use for measuring the concentration of a atmospheric pollutant) must be atmospheric pressure.

Once the value of $u_3$ is selected, the corresponding value of $u_2$ will be determined in experimental manner, if necessary by making a first theoretical approach. In this case, it is advantageous to use a band-pass filter as wide as possible, however remaining compatible with the removal of the lines of other possible constituents of the samples to be examined.

By way of example, a device of the type which has just been defined enables the measurement by infrared absorption, over a thickness of the atmosphere of several kilometers, of the contents of nitrogen-oxide, of burned hydrocarbons or of $SO_2$ of the order of some ppb, with high sensitivity detectors (bolometers at liquid nitrogen temperature). The measurement can be effected by placing at the same station a projector and the device, and at another station positioned at several kilometers, a simple trihedral reflector of large size. In this case, it is convenient to use a content of pollutant in the chambers (that is to say a partial pressure of pollutant) very much higher than that to be detected, exceeding 100 or 1,000 times greater.

By way of example again, it may be indicated that a device has been produced for estimating the hydrocarbons present in the high atmosphere. This device is intended to be carried by a balloon or aircraft and to effect the analysis by sighting the sun when the latter is low on the horizon. This method of estimation has the advantage of avoiding the influence of pollutants present in high amount at low altitude, and of increasing the sensitivity due to the fact of the very considerable thickness of the atmosphere traversed. The source of light is then constituted by the sun itself, which has substantially a black body radiation at 5,500°K. The gas to be estimated being methane $CH_4$ whose concentration at an altitude of the order of 20 km is about 1 ppm, a chamber 14 is used in which the partial pressure is of the order of atmospheric pressure at ground level and, corelatively, the chambers 11 and 12 in which the partial pressure of methane is of the order of one third of the preceding pressure. For the thicknesses of the atmosphere traversed at glancing incidence, a chamber length of 8 cm is sufficient. The filter 31 is composite. It is constituted by the juxtaposition of a sheet of indium antimonide and a sheet of fluorine. The filter thus produced comprises a band-pass which covers approximately the band of methane, between 7 and 8.5 microns. The diluting gas used in the chambers 11, 12 and 15 must simply respond to the condition of not having intense lines capable of interfering with those of the component to be estimated and of not widening in excessive manner the lines of this component. The device which has been produced uses argon, which is available commercially with a very low level of impurities. There could however also be used dry nitrogen of high purity.

In other cases, the presence in the mixture to be analysed of an interfering component having an absorption band covering partially that of the component to be estimated (and possibly having an absorption line which reaches one of the sides of the absorption lines of the component to be estimated) leads to no longer seeking maximum sensitivity, but selectivity or maximum resolution. For that, one is led to reduce the value of $u_3$ (and co-relatively the value of $u_2$) to preserve a null signal when $u_1 = 0$). On this subject, it must be underlined that the complete explanation of the increase in sensitivity when $u_3$ is increased and, conversely, the increase in the selectivity at the price of a reduction of sensitivity when $u_3$ is reduced, can only be fully justified on the basis of complex calculations bringing into consideration the line profile at various partial pressures. However an intuitive explanation can be given: if the beam of light only traverses a small amount of gas to be estimated, absorption takes place essentially at the centre of the line, whence a high selectivity in wave length. If, on the contrary, the quantity increases, absorption is effected over a widened zone; in other words, the line is spread in wavelength.

In practice one operates in experimental manner: there is placed in front of the apparatus a chamber interposing on the path of the beam a quantity of interfering gas corresponding with that which it is expected to encounter and $u_3$ is gradually reduced (and co-relatively $u_2$) until the obtaining of maximum contrast. The initial choice of $u_2$ before the experimental explorations can be done on the basis of theoretical considerations, although the latter frequently require a complex simulation on the computer, especially when several lines are concerned in the measurement.

In summary form it can be said that the result to be achieved is to give the signal due to the interfering component for a fraction of the band-pass of the filter a sign opposite that of the signal for another portion of the same band-pass, so as to obtain an at least partial compensation, (given the haphazard character of the variation along the band-pass), whilst the value selected for $u_3$ is such that the signal is added for the gaseous component to be estimated in the whole of the band-pass.

There is then given to the filter 31 used a band-pass which remains broadly greater than the width of the line of the component but is reduced to an extent compatible with a sufficient sensitivity. In practice one is always led to use an interference filter, comprising generally 150 to 300 layers.

Figure 4:
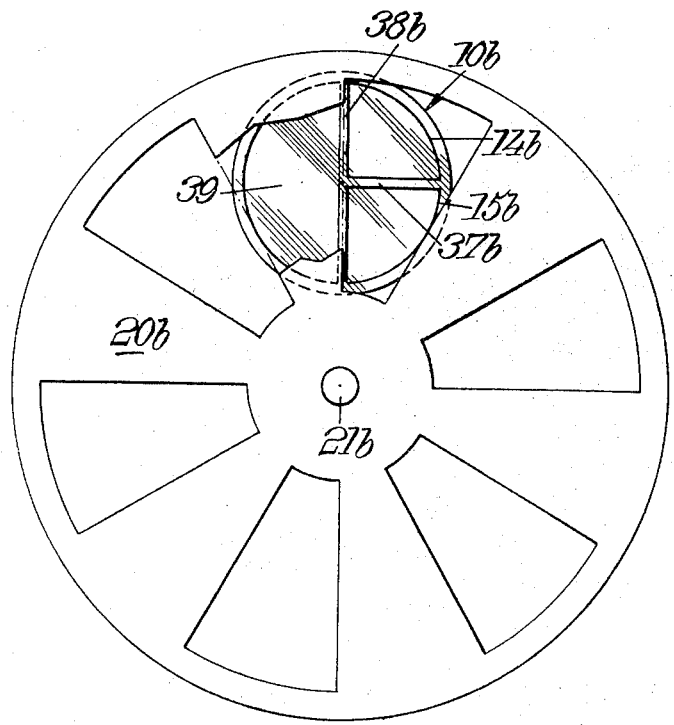
FIG. 4 is an end view of the chamber and of the modulator of a device constituting another modification.

FIGS. 3 and 4 show two modifications of the device. The block 10a shown in FIG. 3 is differentiated from that of FIGS. 1 and 2 in that the four chambers 11a, 12a, 14a and 15a are separated by a simple radial partitions 37 and 38. Such a block lends itself easily to manufacture by moulding. The modulator can be a disc similar to the disc 20 illustrated in FIG. 1.

In the embodiment of FIG. 4, the block 10b comprises a diametric partition 38b which separates a single compartment 39, replacing the chambers 11 and 12 of the device of FIG. 1, from two compartments 14a and 15b, separated by a half-partition 37b perpendicular to the partition 38b. In this case, the modulator 20b is constituted by a disc rotating around an axis 21b situated in the plane of the partition 38b. This modulating disc comprises openings in the form of a sector, having an angular extent such that they cover the whole of the compartment 39 or the whole of compartments 14b and 15b. This arrangement has the drawback of transverse bulk distinctly greater than that of the preceding ones.

The invention is obviously not limited to the particular embodiments described by way of examples, but is capable of numerous modifications. The modulator can be constituted by means other than a rotary disc, for example by a vibrating strip. The chambers can be of other shapes than those which have been shown. It is possible to make the measurement with radiation other than infrared. In particular one may operate in the ultraviolet, for example to measure a content of $SO_2$ in a sample of air, with a natural or artificial light source. If fixing the characteristics of the device is acceptable, there may be used chambers of different lengths, but all occupied by the same reference mixture. The mixture to be analysed can be contained in one chamber and constituted by a sample. Each of the enclosures defined above can be constituted of several chambers containing equal or different masses of the constituent to be estimated, the modulator being obviously adapted.

Although this solution generally only has a limited interest, lastly, by using two sets of four chambers, each set being adapted to a different constituent to be estimated, two constituents at a time can be estimated. But this solution is generally no more advantageous than the employment of two separate devices.

We claim:
1. Method for determining a component of interest of a gaseous mixture, said method using the absorption or the emission of a characteristic radiation of said component and comprising
    alternately and cyclically
    passing a beam of radiation emerging from said mixture and whose spectral composition contains at least one characteristic ray of the component through an enclosure through which the beam encounters a predetermined weight of the component of interest
    and splitting said beam and simultaneously passing part of said beam through a second enclosure where the beam encounters a weight of the component of interest greater than said predetermined weight and the remainder of said beam through a weight of said component substantially less than said predetermined weight,
    and measuring the cyclical variations in the beam which alternately is passed through said first enclosure and is passed partly through said second enclosure and partly through said lesser weight of component.

2. Method according to claim 1, wherein one half of the beam is passed through the second of said enclosures and the other half of said beam is passed through a weight substantially nil of said component.

3. Method according to claim 1, wherein said predetermined weight is selected so that the variations in intensity are nil when the said gaseous mixture does not contain said component.

4. Device for determining a component of interest of a gaseous mixture using absorption or emission by said mixture of a characteristic radiation of the component, said device comprising a first enclosure containing a predetermined weight of the component of interest, a second enclosure containing a weight of the component of interest greater than said predetermined weight and a third enclosure containing a weight substantially nil of said component of interest, means for receiving a beam of radiation emerging from said mixture, and alternately and cyclically first directing the whole of said beam through the first enclosure, and then directing a predetermined part of said beam through the second enclosure and the remainder of said beam through the third enclosure, a filter located on the paths of said beam from the enclosures and transparent for part only of the spectral absorption or emission band of said component, a detector positioned to receive the beam transmitted by the filter, and means for measuring the variations in the output signal from the detector.

5. Device according to claim 4, wherein the first enclosure is constituted by a group of two chambers offering the beam each a predetermined passage cross-area, and the second and third enclosures being constituted by chambers having the same length and the same cross-area as each of said two chambers.

6. Device according to calim 4, wherein the first, second and third enclosures consist of first, second and third chambers, respectively, the first chamber offering the beam a cross-area double the cross-area of each of the two other chambers.

7. Device according to claim 4, wherein the detector and the filter are cooled to a cryogenic temperature.

8. Device according to claim 6, wherein the chambers each contain a gas which does not absorb in the band width of the filters, the first and the second chambers containing in addition predetermined contents of said component, the partial pressure of said component in the first chamber being greater than its partial pressure in the second chamber.

9. Device according to claim 4, comprising a concentrating optical device located in the beam before said directing means and providing, from a cylindrical input beam, a cylindrical output beam of smaller diameter having a constant energy density if the input beam has a constant energy density.

10. Device according to claim 4, wherein the weights of the constituent of interest in said enclosures are such that the output signal is nill when said mixture contains a nil content of said constituent.

11. Device according to claim 9, wherein said concentrating optical device is a telescope.

* * * * *